US009046282B2

(12) United States Patent
Belikoff et al.

(10) Patent No.: US 9,046,282 B2
(45) Date of Patent: Jun. 2, 2015

(54) FOLDING MOUNT FOR PHOTOVOLTAIC MODULES

(75) Inventors: Michael A. Belikoff, Mendham, NJ (US); John Anthony Bellacicco, Stamford, CT (US); Henry B. Cabuhay, Morris Plains, NJ (US); John Hartelius, Brick, NJ (US); Chris Mahn, Peoria, AZ (US); Michael J. Monaco, Stanhope, NJ (US); Sharad Ramani, Highstown, NJ (US); Mark Zeni, Branchburg, NJ (US)

(73) Assignee: First Solar, Inc., Perrysburg, OH (US)

( * ) Notice: Subject to any disclaimer, the term of this patent is extended or adjusted under 35 U.S.C. 154(b) by 422 days.

(21) Appl. No.: 13/197,175

(22) Filed: Aug. 3, 2011

(65) Prior Publication Data

US 2012/0031862 A1   Feb. 9, 2012

Related U.S. Application Data

(60) Provisional application No. 61/371,528, filed on Aug. 6, 2010.

(51) Int. Cl.
*F24J 2/52* (2006.01)

(52) U.S. Cl.
CPC .......... *F24J 2/5232* (2013.01); *Y10T 29/49947* (2015.01); *Y10T 29/49826* (2015.01); *F24J 2/5205* (2013.01); *F24J 2/526* (2013.01); *F24J 2002/5277* (2013.01); *Y02B 10/12* (2013.01); *Y02E 10/47* (2013.01)

(58) Field of Classification Search
CPC ....... F24J 2/5207; F24J 2/5233; F24J 2/5252; F24J 2/526; F24J 2/5232; F24J 2002/4656; F24J 2002/5215; F24J 2002/5226; F24J 2002/5277; F24J 2002/5283; H02S 20/24; H02S 20/00; Y02B 10/12; Y02B 10/20; Y02E 10/47; Y02E 10/50
USPC ............ 52/173.3, 173.1, 29, 64, 65, 73, 645, 52/646; 136/243–245; 126/621, 623; 411/24, 32, 341, 342; 135/143, 144
See application file for complete search history.

(56) References Cited

U.S. PATENT DOCUMENTS

| 79,801 | A | * | 7/1868 | Adams .......................... 292/153 |
| 3,111,202 | A | | 11/1963 | Costello |
| 3,460,992 | A | * | 8/1969 | Aralov ........................... 136/245 |
| 3,563,592 | A | * | 2/1971 | Preston ......................... 292/263 |
| 4,269,173 | A | | 5/1981 | Krueger et al. |
| 4,421,943 | A | | 12/1983 | Withjack |
| 4,631,849 | A | * | 12/1986 | Jeffery ........................... 40/610 |
| 5,125,608 | A | | 6/1992 | McMaster et al. |
| 5,308,037 | A | | 5/1994 | Gonzalez |
| 5,412,848 | A | * | 5/1995 | Precourt, Jr. ...................... 24/99 |
| 5,487,791 | A | | 1/1996 | Everman et al. |
| 5,664,874 | A | | 9/1997 | Winterer |
| 5,735,100 | A | | 4/1998 | Campbell |

(Continued)

FOREIGN PATENT DOCUMENTS

| CN | 1232518 A | 10/1999 |
| CN | 1900458 A | 1/2007 |

(Continued)

*Primary Examiner* — Brian Glessner
*Assistant Examiner* — Babajide Demuren
(74) *Attorney, Agent, or Firm* — Dickstein Shapiro LLP

(57) ABSTRACT

This invention relates to photovoltaic modules and arrays, methods of assembling photovoltaic arrays, and methods for shipping components of photovoltaic arrays.

14 Claims, 8 Drawing Sheets

(56) References Cited

U.S. PATENT DOCUMENTS

| | | | |
|---|---|---|---|
| 5,969,695 A * | 10/1999 | Bassily et al. | 343/915 |
| 6,065,255 A | 5/2000 | Stern et al. | |
| 6,284,967 B1 | 9/2001 | Hakan et al. | |
| 6,423,895 B1 * | 7/2002 | Murphy et al. | 136/245 |
| 6,722,357 B2 * | 4/2004 | Shingleton | 126/600 |
| 6,814,070 B2 | 11/2004 | Bourne et al. | |
| 7,552,513 B2 | 6/2009 | Cheng | |
| 2003/0019180 A1 | 1/2003 | Warren et al. | |
| 2003/0070368 A1 * | 4/2003 | Shingleton | 52/173.3 |
| 2004/0231274 A1 | 11/2004 | Engstrom | |
| 2005/0103376 A1 | 5/2005 | Matsushita et al. | |
| 2006/0071437 A1 | 4/2006 | Blasco | |
| 2007/0069542 A1 | 3/2007 | Steiger et al. | |
| 2007/0151594 A1 | 7/2007 | Mascolo et al. | |
| 2008/0016818 A1 | 1/2008 | Heirich | |
| 2008/0223262 A1 | 9/2008 | Chew et al. | |
| 2008/0264467 A1 | 10/2008 | Doko | |
| 2009/0134297 A1 * | 5/2009 | Beck | 248/237 |
| 2009/0205703 A1 | 8/2009 | Umotoy et al. | |
| 2009/0256046 A1 | 10/2009 | Hausner et al. | |
| 2010/0071996 A1 | 3/2010 | Huang | |
| 2010/0089433 A1 | 4/2010 | Conger | |
| 2010/0127142 A1 | 5/2010 | Genschorek | |
| 2010/0132274 A1 | 6/2010 | Reyal et al. | |
| 2010/0154327 A1 | 6/2010 | Reyal et al. | |
| 2010/0236183 A1 | 9/2010 | Cusson et al. | |
| 2010/0237028 A1 | 9/2010 | Cusson | |
| 2010/0237029 A1 | 9/2010 | Cusson et al. | |
| 2010/0269446 A1 | 10/2010 | Merrifield | |
| 2010/0307991 A1 | 12/2010 | Belikoff et al. | |
| 2011/0072631 A1 | 3/2011 | Hartelius et al. | |

FOREIGN PATENT DOCUMENTS

| | | |
|---|---|---|
| CN | 101095017 A | 12/2007 |
| CN | 201014798 Y | 1/2008 |
| CN | 100424305 C | 10/2008 |
| CN | 101345269 A | 1/2009 |
| CN | 201188591 Y | 1/2009 |
| CN | 101387151 A | 3/2009 |
| CN | 201256369 Y | 6/2009 |
| CN | 201435696 Y | 3/2010 |
| CN | 201498521 U | 6/2010 |
| CN | 201576689 U | 9/2010 |
| CN | 201757526 U | 3/2011 |
| CN | 101387151 B | 5/2011 |
| EP | 0 993 051 A2 | 4/2000 |
| EP | 2 221 555 A1 | 8/2010 |
| EP | 2 339 262 | 6/2011 |
| WO | WO 97/19291 A1 | 5/1997 |
| WO | WO 2006/072230 A1 | 7/2006 |
| WO | WO 2008/145903 A1 | 12/2008 |
| WO | WO 2009/015424 A1 | 2/2009 |
| WO | WO 2009/146511 A1 | 12/2009 |
| WO | WO 2010/044829 A1 | 4/2010 |
| WO | WO 2010/045514 A2 | 4/2010 |
| WO | WO 2010/053089 A1 | 5/2010 |
| WO | WO 2010/057781 A2 | 5/2010 |
| WO | WO 2010/064656 A1 | 6/2010 |
| WO | WO 2010/107419 A1 | 9/2010 |
| WO | WO 2010/107466 A1 | 9/2010 |
| WO | WO 2010/130720 A2 | 11/2010 |
| WO | WO 2011/016498 A1 | 2/2011 |
| WO | WO 2011/023902 A2 | 3/2011 |
| WO | WO 2011/029758 A1 | 3/2011 |

* cited by examiner

FOLDING MOUNT FOR PHOTOVOLTAIC MODULES

This application claims priority under 35 U.S.C. §119(e) to Provisional Application No. 61/371,528, filed on Aug. 6, 2010, which is incorporated herein by reference in its entirety.

TECHNICAL FIELD

This invention relates to photovoltaic modules and arrays, methods of assembling photovoltaic arrays, and methods for shipping components of photovoltaic arrays.

BACKGROUND

Photovoltaic arrays include a plurality of photovoltaic modules. Each module is fastened to a mount to create an array. The mount may be assembled at the job site or preassembled and shipped to the job site. Unfortunately, assembling a mount at the job site can be labor intensive and costly. Likewise, transporting a preassembled mount to the job site can be costly.

DETAILED DESCRIPTION

Figure 1:
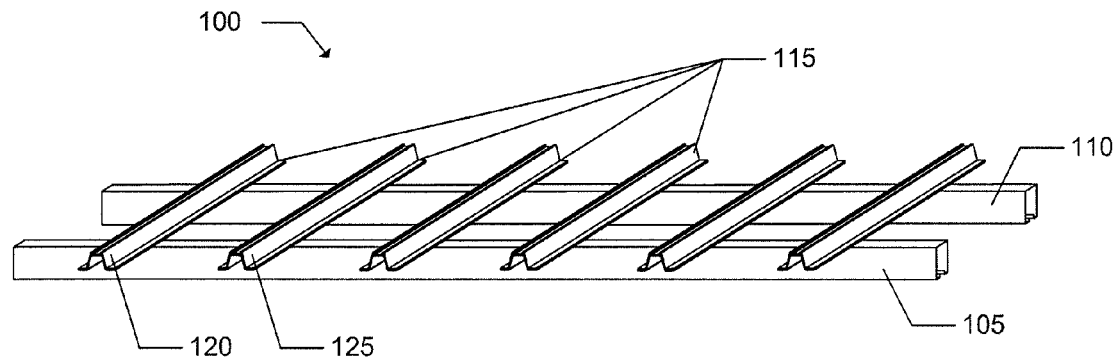
FIG. 1 is perspective view of a folding mount.

Efficiency in terms of time and expense can be a significant driver impacting the expense of installation of photovoltaic arrays. Both the shipping expense and labor expense for a photovoltaic array installation can be improved by developing a folding mount that can be preassembled and shipped to a job site at a reasonable cost. The folding mount described herein has many advantages over previous mounting systems. For example, the folding mount can be collapsed and components nested during shipping to greatly reduce shipping expenses. In addition, the folding mount can be preassembled in a factory where quality of materials and assembly can be closely monitored and controlled, which can lead to more reliability and dependability of the structures once installed. As a result of its unique design, installation time can be dramatically reduced which lessens the per watt cost of installing an array.

In one aspect, a method for shipping folding mounts for photovoltaic modules may include nesting a first folding mount comprising a top side and a bottom side adjacent to a second folding mount comprising a top side and a bottom side. The bottom side of the first folding mount may be adjacent to the bottom side of the second folding mount. The first folding mount may include a first beam, a second beam substantially parallel to the first beam, a first rail pivotally connected the first beam and pivotally connected to the second beam, and a second rail pivotally connected to the first beam and pivotally connected to the second beam, where the first beam can be moved toward the second beam by moving the first and second rails from a perpendicular orientation relative to the first and second beams to an oblique orientation relative to the first and second beams. The second folding mount may include a first beam, a second beam substantially parallel to the first beam, a first rail pivotally connected to the first beam and pivotally connected to the second beam, and a second rail pivotally connected to the first beam and pivotally connected to the second beam, where the first beam can be moved toward the second beam by moving the first and second rails from a perpendicular orientation relative to the first and second beams to an oblique orientation relative to the first and second beams. Nesting a first folding mount adjacent to a second folding mount may form a first nested pair of folding mounts. Within the nested pair, the first and second rails of the first folding mount may be arranged in an oblique orientation relative to the first and second beams of the first folding mount. Similarly, the first and second rails of the second folding mount may be arranged in an oblique orientation relative to the first and second beams of the second folding mount. The method may include stacking a first nested pair of folding mounts adjacent to a second nested pair of folding mounts to form a nested group of folding mounts within a shipping container. The method may include loading the shipping container onto a vehicle suitable for transporting the shipping container to a job site.

In another aspect, a folding mount for photovoltaic modules may include a first beam, a second beam substantially parallel to the first beam, a first rail pivotally connected to the first beam and pivotally connected to the second beam, and a second rail pivotally connected to the first beam and pivotally connected to the second beam, wherein the first beam can be moved toward the second beam by moving the first and second rails from a perpendicular orientation relative to the first and second beams to an oblique orientation relative to the first and second beams. The first rail may be pivotally connected to the first beam by a fastener. The fastener may include a self-tightening pivoting connection, whereby moving the first rail from an oblique orientation relative to the first beam to a perpendicular orientation relative to the first beam causes the pivoting connection to tighten. The self-tightening pivoting connection may include a screw and a nut threaded onto the screw, whereby moving the first rail from an oblique orientation relative to the first beam to a perpendicular orientation relative to the first beam causes the nut to thread farther onto the screw. The fastener may provide snap assembly of the first rail to the first beam. The first beam may be rolled steel. Similarly, the first rail may be rolled steel.

In another aspect, a method for assembling a photovoltaic array may include fastening a first beam of a folding mount to a first mounting bracket and fastening the first beam of the folding mount to a second mounting bracket. The method may include fastening a second beam of a folding mount to the first mounting bracket and fastening the second beam of the folding mount to the second mounting bracket. The method may include inserting a first upright member into the ground, inserting a second upright member into the ground. The second upright member may be substantially parallel to the first upright member and may be substantially perpendicular to a ground plane. The method may include fastening the first mounting bracket to an exposed end of the first upright member and fastening the second mounting bracket to an exposed end of the second upright member. The first mounting bracket may include a top surface, a bottom surface, and a slotted hole extending from the top surface to the bottom surface. Similarly, the second mounting bracket may include a top surface, a bottom surface, and a slotted hole extending from the top surface to the bottom surface. The folding mount may be fastened to the first mounting bracket by inserting a fastener through the slotted hole from the bottom surface toward the top surface. Similarly, the folding mount may be fastened to the second mounting bracket by inserting a fastener through the slotted hole from the bottom surface toward the top surface. The method may further include mounting a rear surface of a photovoltaic module adjacent to a first rail and a second rail of the folding mount. The photovoltaic module may be secured to the first and second rail with a plurality of fasteners. The plurality of fasteners may include tamper proof fasteners.

Referring, by way of example, to FIG. 1, a folding mount 100 may be configured to receive a plurality of photovoltaic modules 1500 and may include a first beam 105, a second beam 110, and a plurality of rails 115 pivotally connected to the first beam 105 and pivotally connected to the second beam 110. In particular, the plurality of rails 115 may include a first rail 120 pivotally connected to the first beam 105 and pivotally connected to the second beam 110. Similarly, the plurality of rails 115 may include a second rail 125 pivotally connected to the first beam 105 and pivotally connected to the second beam 110. Examples of folding mounts are described in U.S. Patent Application Ser. No. 61/184,618 filed on Jun. 5, 2009, which is hereby incorporated by reference in its entirety.

Figure 17:
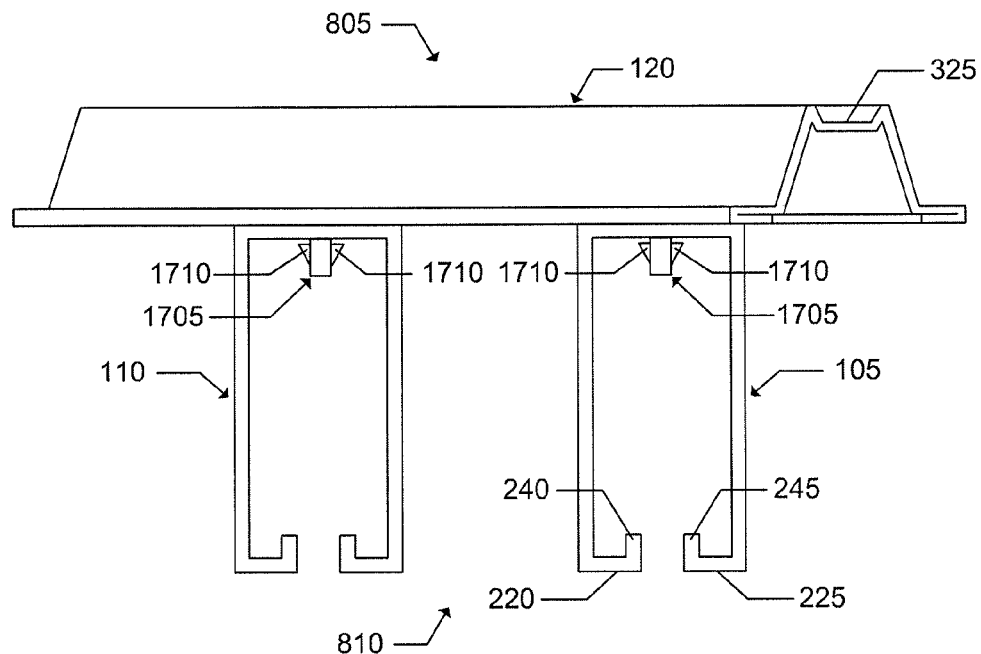
FIG. 17 is an end view of a folding mount in a collapsed position and configured for snap assembly.
Figure 18:
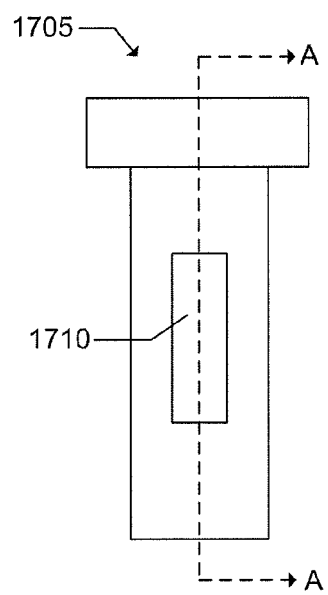
FIG. 18 is a front view of a fastener for snap assembly.
Figure 19:
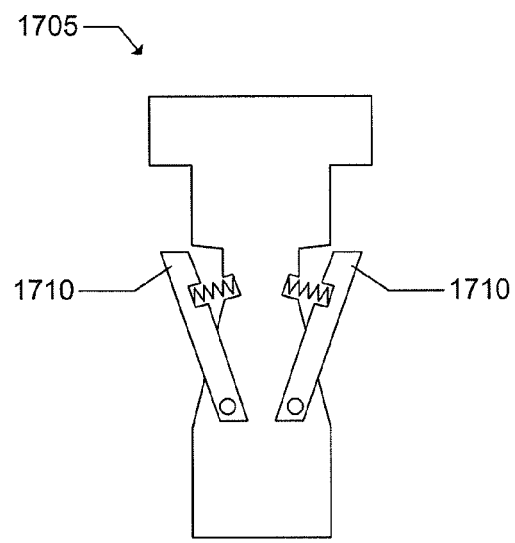
FIG. 19 is a cross-sectional view of the fastener in FIG. 18 along section A-A.

The pivotal connections may include any suitable fasteners such as, for example, nuts and bolts. Alternately, the pivotal connections may include snap connections which facilitate assembly without tools in the field, as shown, by way of example, in FIG. 17. The fastener 1705 may include one or more spring-loaded retractable portions 1710 which permit the fastener to be pushed through a hole but resist removal from the hole. FIG. 19 depicts a cross-sectional view of the spring-loaded fastener shown in FIG. 18. The fastener may include recesses configured to receive the retractable portions 1710 during insertion of the fastener through the hole. By eliminating the need for assembly tools, installation time may be reduced.

Figure 2:
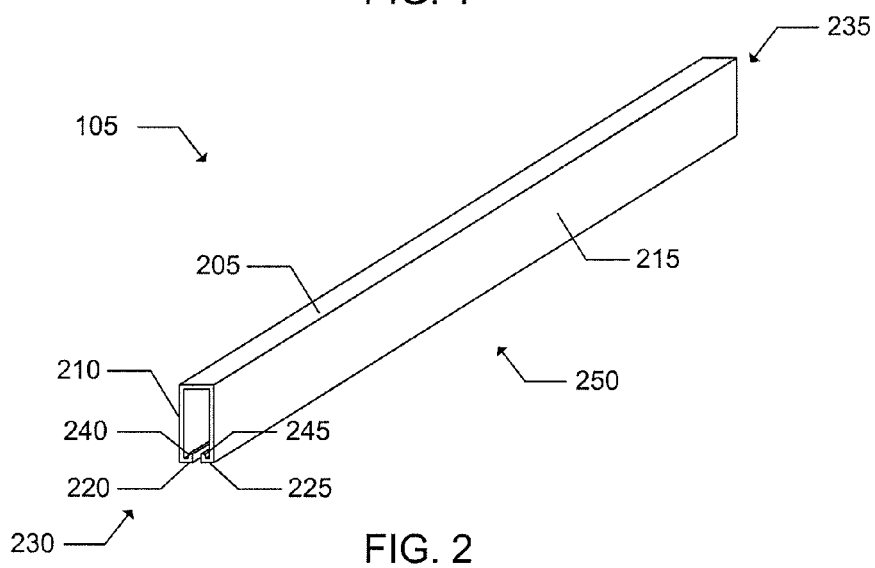
FIG. 2 is a perspective view of a beam for a folding mount.

Referring, by way of example, to FIG. 2, the first beam 105 may have a first end 230 and a second end 235. The first beam 105 may also include a top surface 205, a first side surface 210, a second side surface 215, a first bottom surface 220, and a second bottom surface 225. The bottom side 250 of the first beam 105 may have a portion of material removed to form a gap. This gap provides several advantages. In one example, the mass of the beam may be reduced which lessens shipping expenses incurred when transporting the beam to a job site. The job site may be any geographical location, remote or local, where construction of a photovoltaic array occurs. In another example, by reducing the amount of material used to construct the beam, the manufacturing cost of the beam is reduced. Since material removal can weaken the beam, a first rib 240 and a second rib 245 may be included for strength. The first and second ribs (240, 245) serve to increase the moment of inertia of the beam, thereby increasing the beam's load capacity. Although a beam having a specific cross-sectional geometry is described, this is not limiting. For example, the beam may have a round, oval, rectangular, or triangular. Similarly, any suitable cross-section may be used, and the cross-section may vary along the length of the beam.

Figure 3:
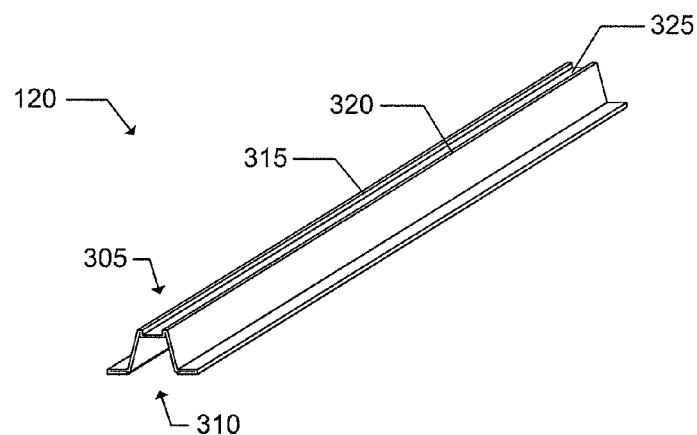
FIG. 3 is a perspective view of a rail for a folding mount.

Referring, by way of example, to FIG. 3, the first rail 120 may include a top side 305 and a bottom side 310. The top side 305 may include one or more surfaces configured to receive a photovoltaic module 1500. For example, the top side 305 may include a first top surface 315 and a second top surface 320 spaced apart to form parallel elongated surfaces. A channel 325 may be formed between the first and second top surfaces (315, 320) and may serve several purposes. First, the channel 325 may provide a recess for fasteners such as nuts or bolt heads. As a result, a rear surface of the photovoltaic module 1500 can lie flat against the first and second top surfaces (315, 320) without interference from fasteners. Second, the channel 325 may provide a pathway to evacuate rainwater that may accumulate between the module 1500 and the rail 120. This can be desirable, since conductive rainwater can promote leakage current between the module 1500 and the rail 120, thereby decreasing the module's efficiency through parasitic losses.

The beams (e.g. 105, 110) and the rails (e.g. 120, 125) may be constructed from any suitable material such as, for example, extruded aluminum, fiber reinforced plastic (e.g., fiberglass or carbon fiber), structural steel or rolled steel. To prevent corrosion caused by exposure to weather, the surfaces of each beam and each rail may be treated. For example, the surfaces of the beams and rails may be galvanized, painted, or electroplated. Alternately, any suitable surface treatment may be applied to the beams and rails.

Figure 4:
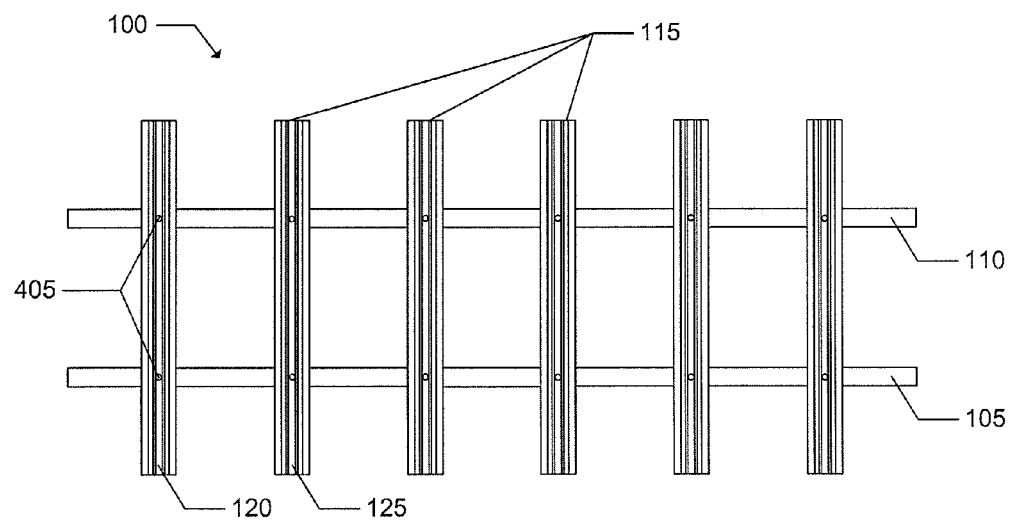
FIG. 4 is a top view of a folding mount in an open position.
Figure 5:
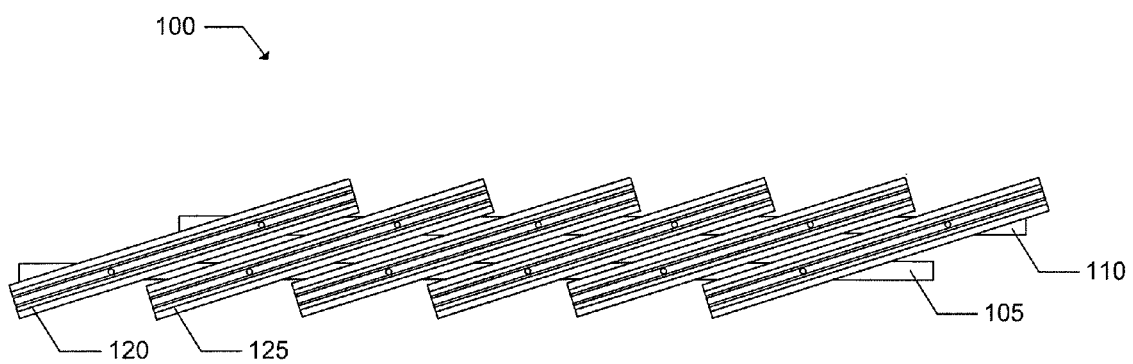
FIG. 5 is a top view of a folding mount in a collapsed position.

FIG. 4 shows a top view of a plurality of rails 115 pivotally connected to the first beam 105 and pivotally connected to the second beam 110. The first beam 105 may be substantially parallel to the second beam 110. Similarly, the first rail 120 may be substantially parallel to the second rail 125. FIG. 4 depicts a first orientation where the first and second rails (120, 125) are substantially perpendicular to the first and second beams (105, 110). As a result of the pivotal connections 405 joining the plurality of rails 115 to the first and second beams (105, 110), a force applied to an end of either the first or second beam causes the folding mount to collapse. FIG. 5 depicts a second orientation where the first and second rails (120, 125) are oblique to the first and second beams (105, 110).

Figure 6:
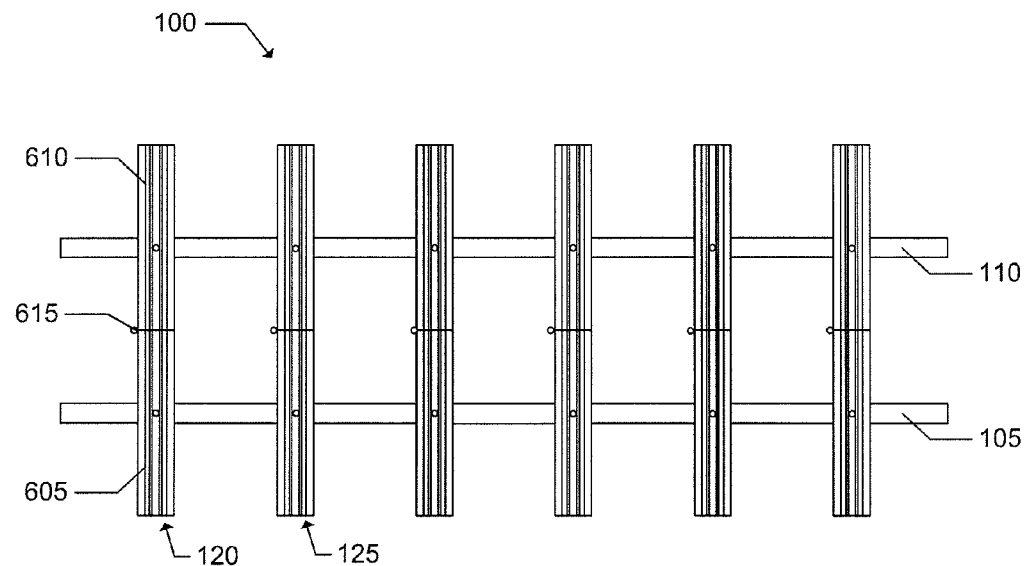
FIG. 6 is a top view of a folding mount in an open position.
Figure 7:
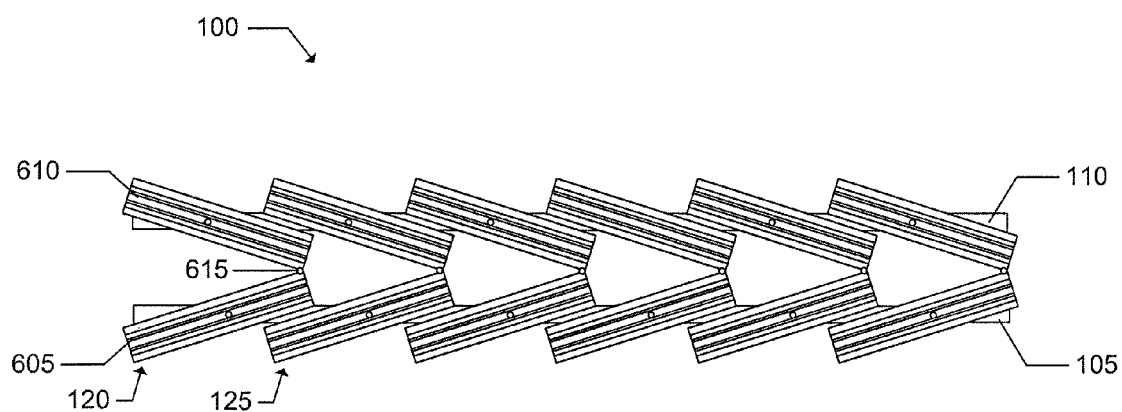
FIG. 7 is a top view of a folding mount in a collapsed position.

FIGS. 6 and 7 show an alternate way of pivotally connecting the plurality of rails 115 to the first and second beams (105, 110). As shown in FIG. 6, the first rail 120 may include a first portion 610 and a second portion 615. The first portion 610 may be hingedly connected to the second portion 615 by a hinge 615 or other suitable device. By applying a force near the hinge 615 of each rail, the folding mount 100 can be collapsed as shown in FIG. 7.

Figure 8:
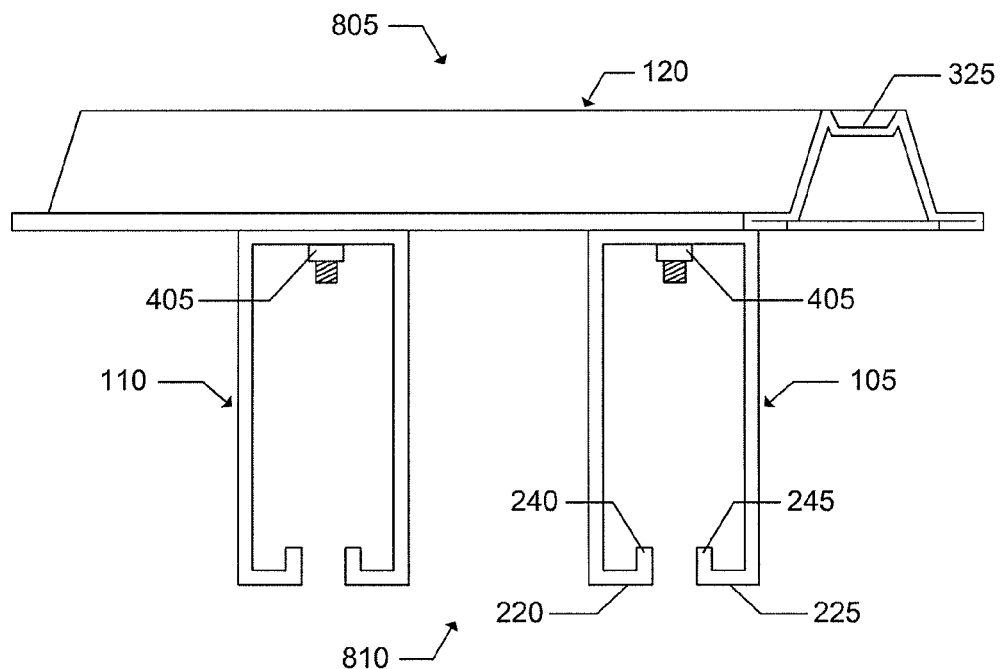
FIG. 8 is an end view of a folding mount in a collapsed position.

By collapsing the folding mount 100 as shown in FIGS. 5 and 7, the shipping volume of a plurality of folding mount components can be significantly reduced. As a result, a greater number of folding mounts can be packed into a shipping container, thereby reducing shipping costs and reducing the overall per watt installation cost of the photovoltaic array. FIG. 8 shows an end view of the folding mount depicted in FIG. 5. The folding mount may include a top side 805 and a bottom side 810. The pivotal connections 405 joining the first rail to the beams (105, 110) are partially visible in FIG. 8.

Figure 9:
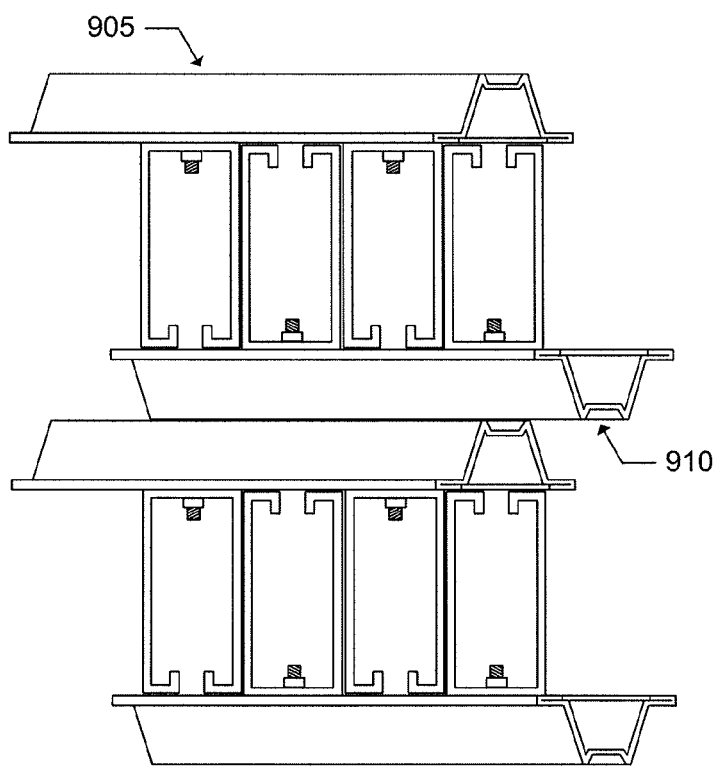
FIG. 9 is an end view of a plurality of folding mounts in a nested configuration.

To further reduce shipping volume, a plurality of folding mounts may be nested as shown by way of example in FIG. 9. Nesting is accomplished by orienting a pair of folding mounts in a closed position and stacking the first folding mount adjacent to the second folding mount, thereby providing complementary contact surfaces. In addition to reducing shipping volume, this configuration also stabilizes the shipment during transport, which improves safety for workers. Two folding mounts may be nested to form a nested pair, and a plurality of nested pairs may be stacked in rows and columns to form nested groups.

During the stacking process, a first folding mount 905 may be positioned adjacent to a second folding mount 910. The bottom side 810 of the second folding mount 910 may be positioned adjacent to the bottom side 810 of the first folding mount 905. This process may be replicated with a plurality of folding mounts. The nested folding mounts may be placed directly onto a surface for shipping. For instance, the nested mounts may be loaded onto a truck, flat bed trailer, ship, railroad car, or any other suitable transport vehicle. Alternately, the nested mounts may be loaded into a shipping container. The shipping container may then be loaded onto any vehicle suitable for transporting the container to a job site. The shipping container may be any suitable container. For example, the shipping container may be a rack, bin, or cargo container. The shipping container may be stackable with similar shipping containers. Also, the shipping container may include recesses configured to receive a pair of forks from a forklift, thereby allowing the shipping container to be easily loaded and unloaded from the transport vehicle. Alternately, the shipping container may include any other suitable components to facilitate loading and unloading. For example, the shipping container may include wheels for rolling or an eye bolt for hoisting.

Figures 10, 11:
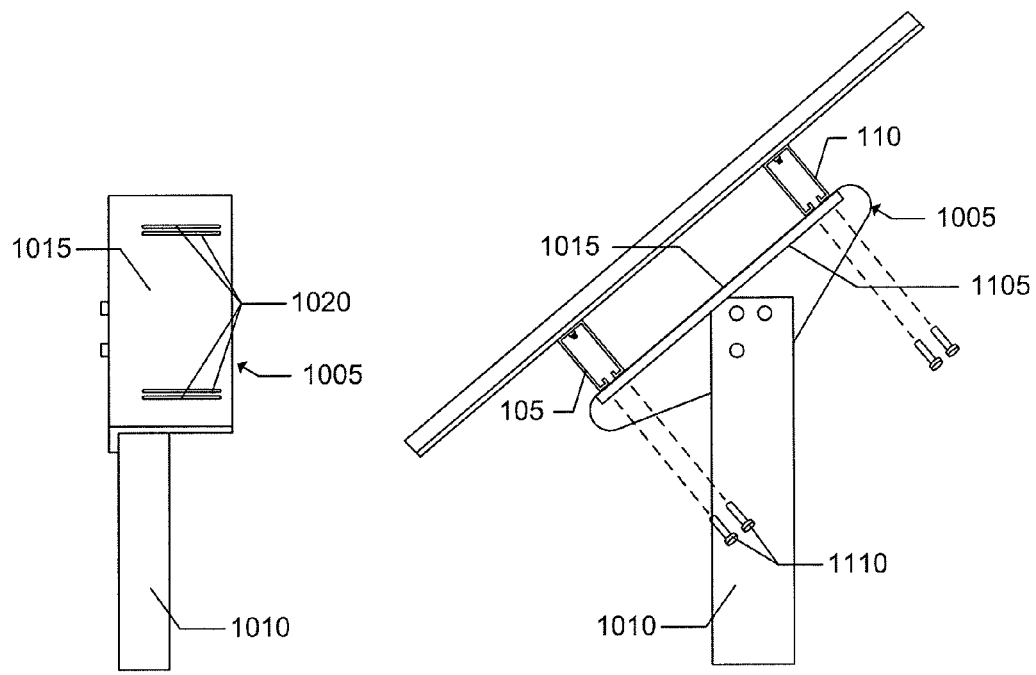
FIG. 10 is a front view of a mounting bracket and an upright member.
FIG. 11 is a right side view of a mounting bracket and an upright member.
Figure 12:
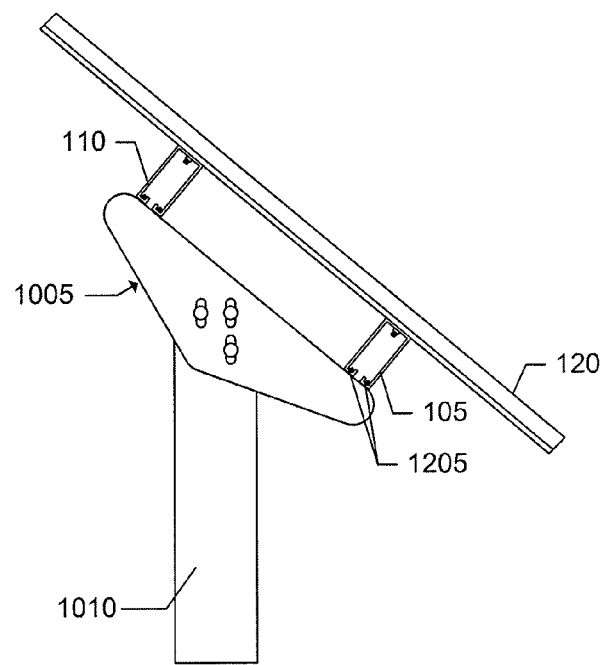
FIG. 12 is a left side view of a mounting bracket and an upright member.

As shown in FIGS. 10, 11, and 12, the folding mount 100 may be connected to a first mounting bracket 1005 that is fastened to a first upright member 1010. FIG. 10 shows a front view of the first mounting bracket 1005 and first upright member 1010, whereas FIGS. 11 and 12 show right and left side views, respectively. The first mounting bracket 1005 may include a top surface 1015, a bottom surface 1105, and a plurality of slotted holes 1020 extending from the top surface 1015 to the bottom surface 1105. The top surface 1015 may be substantially flat and may be configured to receive the folding mount 100. In particular, the first and second bottom surfaces (220, 225) of the first beam 105 of the folding mount 100 may mate with the first mounting bracket 1005 as shown in FIG. 11. Similarly, the first and second surfaces (220, 225) of the second beam 110 of the folding mount 100 may mate with the first mounting bracket 1005.

The first mounting bracket 1005 may include a plurality of slotted holes 1020 for ease of assembly. The slotted holes 1020 reduce the necessity for precise alignment during assembly. As a result, installation time is reduced for each folding mount 100. This can significantly reduce the per watt cost of installing a photovoltaic array 1600. Each of the slotted holes 1020 may pass from the top surface 1015 to the bottom surface 1105 of the first mounting bracket 1005. To fasten the folding mount 100 to the first mounting bracket 1005, one or more fasteners 1110 may be inserted from the bottom surface 1105 towards the top surface 1015. Inserting the fasteners 1110 from the bottom surface 1105 simplifies installation and reduces installation time. While manufacturing of the beams (105, 110), nuts 1205 may be welded to surfaces opposite the first and second bottom surfaces (220, 225) as shown in FIG. 12. The nuts 1205 may permit the fasteners 1110 to be secured without requiring a second tool at the job site. For example, each fastener may be tightened with a first wrench without needing a second wrench to resist rotation of the nut. The nut resists rotation since it is joined to the beam by friction, a weld or other suitable adhesion method. Alternately, a through-hole in the beam may be threaded, thereby permitting the fastener to be threaded directly into the bottom surface (e.g. 220, 225) of the beam and negating a need for nuts.

Figure 13:
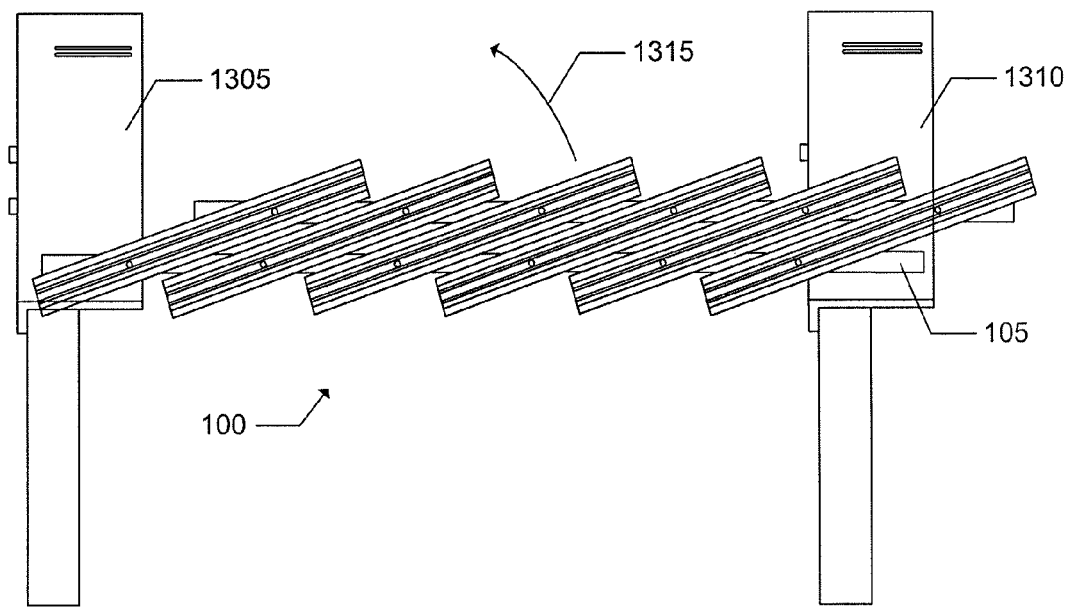
FIG. 13 is a front view of a partially installed folding mount.
Figure 14:
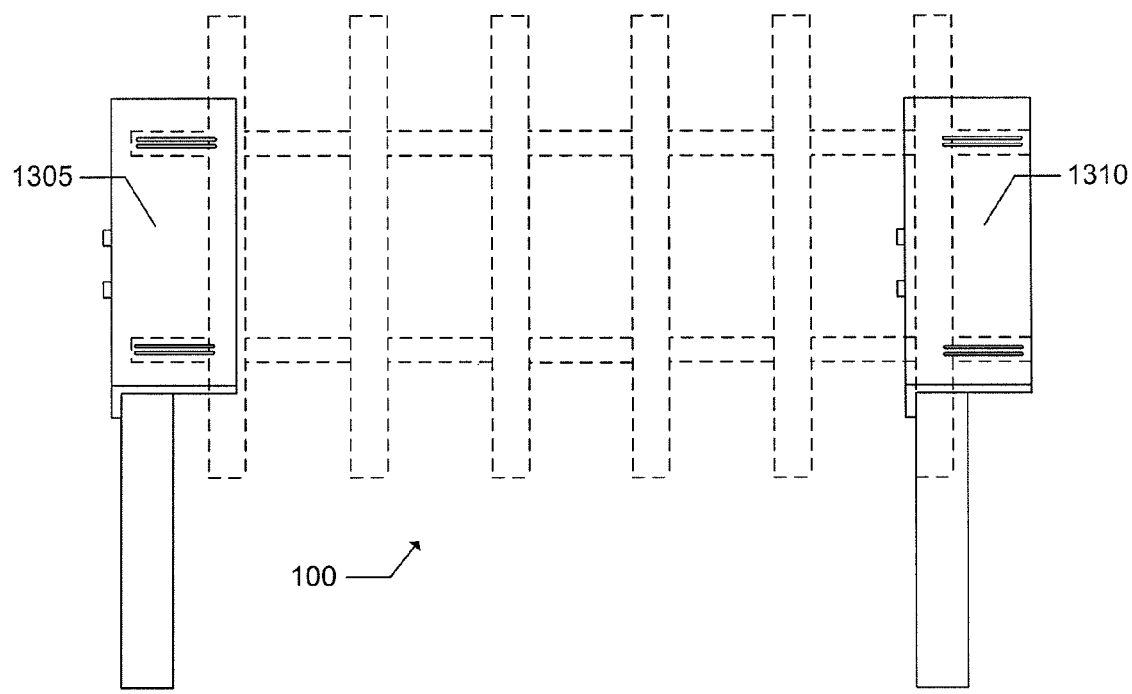
FIG. 14 is a front view of an installed folding mount.

FIGS. 13 and 14 show a strategy for affixing the folding mount 100 to the first and second mounting brackets (1305, 1310). As shown in FIG. 13, the folding mount 100 may be positioned atop the first and second brackets while the folding mount is in a closed position. The first beam 105 of the mount may then be fastened to the first mounting bracket 1305 and the second mounting bracket 1310. By doing so, the first beam 105 is fully secured. During installation of an array, this strategy permits a support vehicle, such as a fork lift, to move on to a second folding mount while workers remain to complete the installation. For example, once the fork lift has moved on, the folding mount may be opened by a worker in a direction indicated by the arrow 1315 in FIG. 13. Once the folding mount is in an open position, as shown in FIG. 14, the second beam 110 may be fastened to the first mounting bracket 1305 and the second mounting bracket 1310.

Once the folding mount 100 is opened and secured atop the mounting brackets (1305, 1310), a plurality of photovoltaic modules 1600 may be installed adjacent to the top surfaces (315, 320) of the plurality of rails 115. For example, a rear surface of a photovoltaic module 1500 may be mounted against the first and second top surfaces (315, 320) of the first rail 120. Similarly, the rear surface of the photovoltaic module 1500 may be mounted against the first and second top surfaces of the second rail 125.

Figure 15:
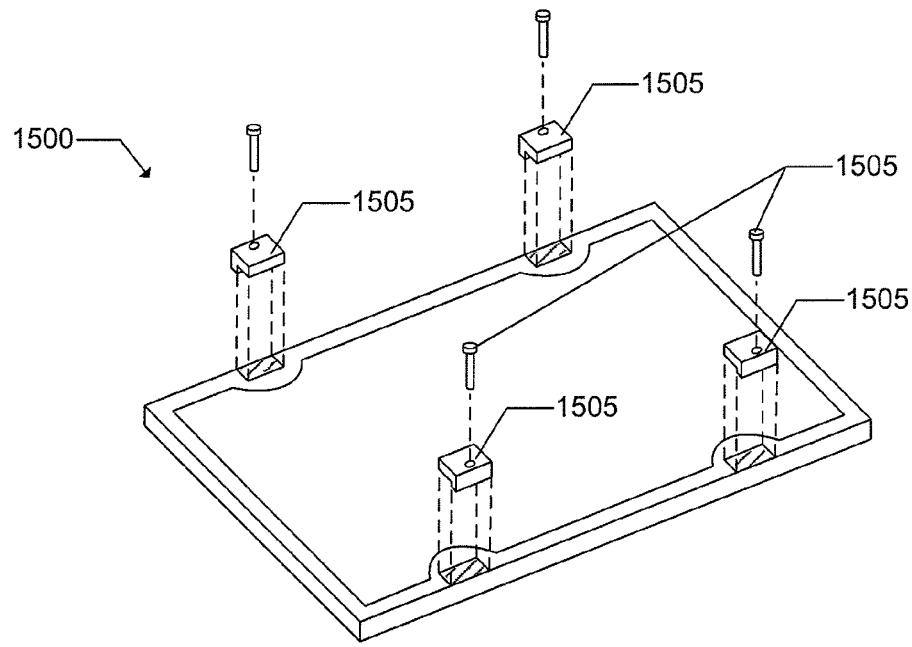
FIG. 15 is a perspective view of a photovoltaic module and fasteners.

The module 1500 may be secured to the folding mount 100 using a plurality of fasteners. In particular, a plurality of clips 1505 may be used as shown in FIG. 15. Each clip may have ample surface area on a contacting surface to ensure clamping loads are adequately distributed across the top surface of the module 1500. Several clips may be used to decrease the clamping load demanded from each clip. Fasteners 1510 may be used to secure the clips 1505 to the rails (e.g. 120, 125). The fasteners 1510 may be tamper proof fasteners, for example, pin nuts, to deter vandalism and theft of the modules. Tamper proof fasteners may be used in components throughout the photovoltaic array for similar reasons.

Figure 16:
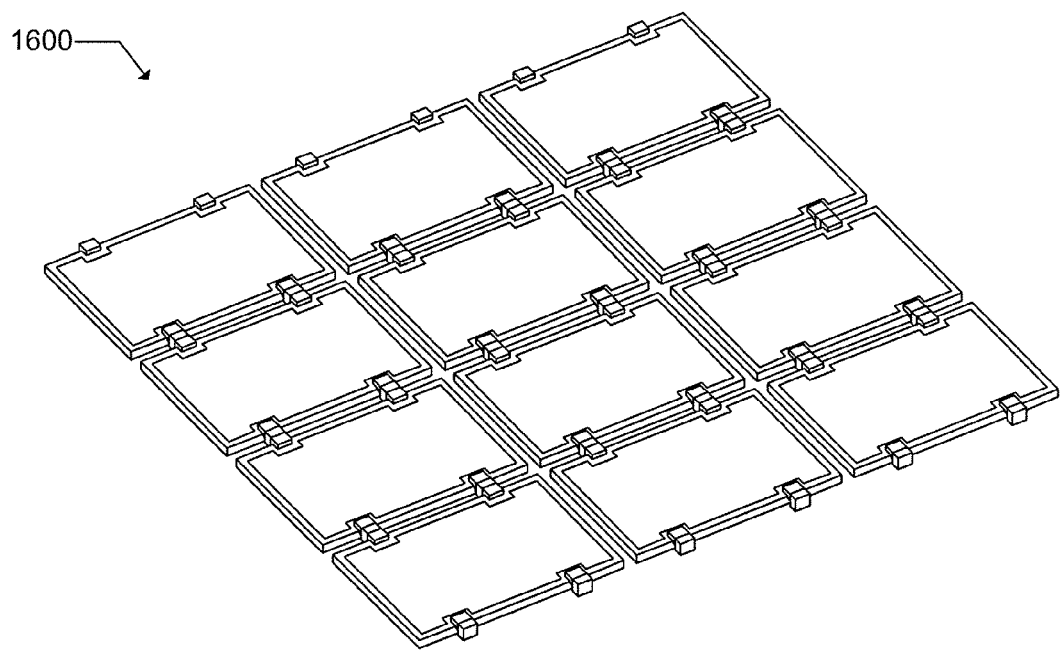
FIG. 16 is an array of photovoltaic modules.

As shown in FIG. 16, a plurality of modules 1600 may be assembled to form a photovoltaic array atop the folding mount 100. The folding mount may be adapted to receive an array having a 3×4 module configuration as shown in FIG. 16. Similarly, the folding mount may be adapted to receive an array having a 3×5 module configuration or a 4×4 module configuration. Likewise, the folding mount may be adapted to receive any number of modules having any suitable configuration. Accordingly, the number or rails and beams may be adjusted to accommodate more or fewer modules than the folding mount 100 in FIG. 1 is capable of accommodating. For example, the number of rails may vary from two to more than six. Similarly, the number of beams may be increased to accommodate more modules. Alternately, the two beams may be replaced with a single beam having sufficient strength to withstand commonly encountered wind and snow loads.

Details of one or more embodiments are set forth in the accompanying drawings and description. Other features, objects, and advantages will be apparent from the description, drawings, and claims. Although a number of embodiments of the invention have been described, it will be understood that various modifications may be made without departing from the spirit and scope of the invention. In particular, steps depicted in figures may be executed in orders differing from the orders depicted. For example, steps may be performed concurrently or in alternate orders from those depicted. It should also be understood that the appended drawings are not necessarily to scale, presenting a somewhat simplified representation of various features and basic principles of the invention.

What is claimed is:

1. A folding mount for photovoltaic modules, the folding mount comprising:
   a first beam;
   a second beam substantially parallel to the first beam;
   a first rail pivotally connected to the first beam and pivotally connected to the second beam; and
   a second rail pivotally connected to the first beam and pivotally connected to the second beam, wherein the first beam can be moved toward the second beam by moving the first and second rails from a perpendicular orientation relative to the first and second beams to an oblique orientation relative to the first and second beams, wherein the first rail is pivotally connected to the first beam by a fastener comprising a self-tightening pivoting connection, and whereby moving the first rail from an oblique orientation relative to the first beam to a perpendicular orientation relative to the first beam causes the pivoting connection to tighten wherein the first beam comprises: a top surface; a first side surface extending from the top surface to a first bottom surface; and a second side surface extending from the top surface to a second bottom surface; wherein the first bottom surface extends from the first side surface to a first rib, and the second bottom surface extends from the second side surface to a second rib.

2. The folding mount of claim 1, wherein
   the first rail comprises a first portion pivotally connected to the first beam and a second portion pivotally connected to the second beam, the first portion being hingedly connected to the second portion.

3. The folding mount of claim 1, wherein the first rail is pivotally connected to the first beam by a fastener.

4. The folding mount of claim 3, wherein the fastener provides snap assembly of the first rail to the first beam.

5. The folding mount of claim 1, wherein the self-tightening pivoting connection comprises a screw and a nut threaded onto the screw, whereby moving the first rail from an oblique orientation relative to the first beam to a perpendicular orientation relative to the first beam causes the nut to thread farther onto the screw.

6. The folding mount of claim 1, wherein the first beam is rolled steel.

7. The folding mount of claim 1, wherein the first rail is rolled steel.

8. The folding mount of claim 1, wherein the first rail comprises:
   a first top surface;
   a second top surface;
   a channel provided between the first top surface and the second top surface;
   a first side surface extending from a first edge of the first top surface opposite the channel;
   a second side surface extending from a first edge of the second top surface opposite the channel;
   a first bottom surface extending from the first side surface;
   a second bottom surface extending from the second side surface;
   wherein the first bottom surface and second bottom surface contact a top surface of each of the first and second beams.

9. A folding mount for photovoltaic modules, the folding mount comprising: a first beam; a second beam substantially parallel to the first beam; a first rail pivotally connected to the first beam and pivotally connected to the second beam; and a second rail pivotally connected to the first beam and pivotally connected to the second beam, wherein the first beam can be moved toward the second beam by moving the first and second rails from a perpendicular orientation relative to the first and second beams to an oblique orientation relative to the first and second beams, wherein the first rail is pivotally connected to the first beam by a fastener comprising a self-tightening pivoting connection, and whereby moving the first rail from an oblique orientation relative to the first beam to a perpendicular orientation relative to the first beam causes the pivoting connection to tighten, wherein the first rail comprises: a first top surface; a second top surface; a channel provided between the first top surface and the second top surface; a first side surface extending from a first edge of the first top surface opposite the channel; a second side surface extending from a first edge of the second top surface opposite the channel; a first bottom surface extending from the first side surface; a second bottom surface extending from the second side surface; wherein the first bottom surface and second bottom surface contact a top surface of each of the first and second beams.

10. The folding mount of claim 9, wherein the first rail comprises a first portion pivotally connected to the first beam and a second portion pivotally connected to the second beam, the first portion being hingedly connected to the second portion.

11. The folding mount of claim 9, wherein the self-tightening pivoting connection comprises a screw and a nut threaded onto the screw, whereby moving the first rail from an oblique orientation relative to the first beam to a perpendicular orientation relative to the first beam causes the nut to thread farther onto the screw.

12. The folding mount of claim 9, wherein the fastener provides snap assembly of the first rail to the first beam.

13. The folding mount of claim 9, wherein the first beam is rolled steel.

14. The folding mount of claim 9, wherein the first rail is rolled steel.

* * * * *